(12) United States Patent
Girodet et al.

(10) Patent No.: US 7,683,354 B2
(45) Date of Patent: Mar. 23, 2010

(54) WATER TREATING REACTOR FOR THE DRINKABILITY THEREOF

(75) Inventors: Pierre Girodet, Asnieres (FR); Christian Vanpeene, Villejuif (FR)

(73) Assignee: OTV SA, Saint Maurice Cedex (FR)

( * ) Notice: Subject to any disclaimer, the term of this patent is extended or adjusted under 35 U.S.C. 154(b) by 201 days.

(21) Appl. No.: 11/814,343

(22) PCT Filed: Jan. 4, 2006

(86) PCT No.: PCT/EP2006/050046

§ 371 (c)(1), (2), (4) Date: Jan. 8, 2008

(87) PCT Pub. No.: WO2006/077177

PCT Pub. Date: Jul. 27, 2006

(65) Prior Publication Data

US 2008/0105606 A1    May 8, 2008

(30) Foreign Application Priority Data

Jan. 21, 2005 (FR) .................................. 05 00673

(51) Int. Cl.
*A61N 5/06* (2006.01)
*G01J 3/10* (2006.01)
*H05G 2/00* (2006.01)

(52) U.S. Cl. ..................... 250/504 R; 250/431; 250/436; 250/437; 250/453.11; 250/454.11; 210/748; 210/96.1; 210/185; 210/192; 210/198.1

(58) Field of Classification Search ................. 250/431, 250/436, 437, 453.11, 454.11; 210/748, 210/96.1, 185, 192, 198.1
See application file for complete search history.

(56) References Cited

U.S. PATENT DOCUMENTS 5,208,461 A * 5/1993 Tipton .................... 250/436

(Continued)

FOREIGN PATENT DOCUMENTS

DE     2630496     12/1977

(Continued)

OTHER PUBLICATIONS

Leopoldshohe et al., "Der Einsatz der UV-Bestrahlung zur Keimzahlreduzierung im biologisch gereinigten Abwasser," Nov. 1992, pp. 1605-1611, No. 11, St. Augustin, Germany, XP000320887.

*Primary Examiner*—Nikita Wells
*Assistant Examiner*—Meenakshi S Sahu
(74) *Attorney, Agent, or Firm*—Coats & Bennett, P.L.L.C.

(57) ABSTRACT

A water treating device includes a cylindrical housing having a longitudinal axis, an inlet and an outlet. Water to be treated enters the inlet, flows through the cylindrical housing and out the outlet. A plurality of elongated UV lamps are disposed in the cylindrical housing. The UV lamps extend generally in the same direction as the longitudinal axis of the cylindrical housing, but are disposed in a non-parallel relationship with the longitudinal axis of the cylindrical housing. Typically one end portion of each of the UV lamps is spaced outwardly from the longitudinal axis of the cylindrical housing. Along the length of each of the UV lamps, the distance between the longitudinal axis of the UV lamps and the longitudinal axis of the cylindrical housing varies.

25 Claims, 6 Drawing Sheets

U.S. PATENT DOCUMENTS 7,317,193 B2 * 1/2008 Girodet .................. 250/455.11
2008/0031771 A1 * 2/2008 Girodet et al. ................ 422/24

FOREIGN PATENT DOCUMENTS

| DE | 4210509 | 10/1993 |
| GB | 2389848 | 12/2003 |
| WO | WO 02/079095 | 10/2002 |

* cited by examiner

WATER TREATING REACTOR FOR THE DRINKABILITY THEREOF

This application is a U.S. National Stage application of PCT Application No. PCT/EP2006/050046, with an international filing date of Jan. 4, 2006. Applicant claims priority based on French application serial no. 05 00673 filed Jan. 21, 2005.

This invention relates to the field of water treatment in order to disinfect water, in particular in the context of processes for making water drinkable.

More specifically, the invention relates to the disinfection of water by ultraviolet radiation. The invention applies to water disinfection devices in the form of closed reactors.

In the field of the invention, a number of types of reactors are known for treatment of water with ultraviolet radiation.

In particular, reactors implementing a plurality of UV lamps arranged parallel to the flow of water to be treated and integrated in systems having an L, U or Z configuration are known. In such systems, the lamps are parallel to an axis of the reactor. The replacement of the lamps in such reactors is possible owing to the presence, at least at one end thereof, of flanges to which the quartz casings of the lamps are attached. These flanges also serve to seal the reactor.

These reactors have the advantages of being easy to produce and of providing good resistance to pressure.

However, it their in-line installation is less easy and sometimes involves complex connections.

Moreover, to prevent a heterogeneous treatment of the water, it is necessary to provide a large number of lamps so as to reduce the risks of excessive dispersion of the UV radiation.

According to another type of reactor, one or more lamps are mounted in a chamber so that they extend perpendicularly to the flow of water to be treated. A reactor of this type is generally implemented for a use corresponding to intermediate-pressure lamps.

Reactors of this type use lamps that have relatively high linear powers, which powers are on the order of 50 $W_{UVC}$/cm.

These intermediate-pressure lamps have the advantage of being compact. However, their energy efficiency is low, and therefore their electricity consumption is around twice as high as low-pressure lamps.

Another type of reactors is also known, in which a plurality of lamps is provided, which lamps are arranged perpendicularly to the flow of water to be treated, according to a parallelepiped structure and a lattice arrangement.

This reactor design makes it possible to use low-pressure lamps which are advantageous in terms of their low operation costs as mentioned above.

Reactors of this type have the disadvantage, however, of providing only low-pressure resistance due to their characteristic parallelepiped structure, as well as a high cost, which of course tends to limit their use.

The invention is intended in particular to overcome the disadvantages of the prior art.

More specifically, the invention is intended to propose a new reactor design for treating water by UV radiation, of the type implementing a plurality of UV lamp-forming means, which makes it possible to optimise the power diffused with respect to the conventional reactors of the same type.

The invention is also intended to provide such a reactor that allows for easy installation, easy access to the lamps and easy disassembly thereof for maintenance purposes.

The invention is also intended to provide such a reactor that provides satisfactory pressure resistance.

The invention is also intended to provide such a reactor that can treat relatively large amounts of water.

Another objective of the invention is to provide such a reactor with a simple design and that can be produced and implemented easily and inexpensively.

These objectives, as well as others that will appear below, are achieved by the invention, which relates to a device for treating water in order to make it drinkable, having a substantially cylindrical housing, inlet means for the water to be treated, and outlet means for the treated water cooperating with said housing, and a plurality of UV lamp-forming means in which said UV lamp-forming means are arranged inside said housing so that the longitudinal axis of at least one of them forms a non-zero angle and non-90° angle with the longitudinal axis of said substantially cylindrical housing.

Conventionally, the lamp-forming means include a UV lamp itself and a quartz sheath protecting said lamp.

The reactor according to the invention makes it possible to combine the advantage of a relatively high treatment capacity with that of a particularly effective distribution of the UV radiation distributed by the lamp-forming means.

Indeed, the principle of the invention makes it possible to arrange the UV lamp-forming means so that they are tilted with respect to the longitudinal axis of the reactor by ruling out a perpendicular position of said lamp-forming means with respect to said axis. Thus, the lamp-forming means occupy the cylindrical space defined by the housing in an optimised manner, compared to a reactor of the prior art, which would use an equivalent number of lamp-forming means.

In addition, a reactor according to the invention has the advantage of providing satisfactory resistance to pressure due to the cylindrical shape of its housing.

The angle of tilt of at least some of said lamp-forming means tilted with respect to the longitudinal axis of the reactor is less than 45°.

According to an advantageous solution, at least some of said lamp-forming means are arranged inside said housing by forming a plurality of non-zero and non-90° angles with the longitudinal axis of said substantially cylindrical housing.

By thus using a plurality of angles of tilt of the lamp-forming means, the distribution of the lamp-forming means is further optimised in the chamber of the reactor, thereby improving the distribution of the UV radiation and the dose distribution. Said inlet means and/or said outlet means for the treated water advantageously have means for access to at least some of the UV lamps of said lamp-forming means.

The maintenance and/or replacement of the lamps can thus easily be performed.

In this case, said access means are preferably distributed in a crown arrangement on said inlet means and/or said outlet means.

The access means in question are advantageously distributed over a frusto-conical portion of said inlet means and/or said outlet means.

According to an advantageous solution, the device has at least one first set of UV lamp-forming means of which at least some cooperate at one of their ends with access means provided on said inlet means or on said outlet means, and the other of their ends is received by at least one support element provided inside said housing.

It is thus possible to distribute the bulk of the access means in two distinct areas, namely the inlet means and the outlet means, while ensuring satisfactory maintenance of the lamp-forming means.

According to a preferred embodiment, said first set of lamp-forming means includes a first series of UV lamp-forming means forming at least one first zero or non-zero angle $\partial 1$ with a longitudinal plane of said cylinder and a second series of UV lamp-forming means forming at least one second non-zero angle ∂2 different from angle ∂1 with said longitudinal plane P of said cylinder.

The spatial distribution of the lamp-forming means inside the reactor is thus optimised, by creating a sort of entanglement of the lamp-forming means while providing regular spaces between them so as to provide a homogeneous treatment inside the chamber of the reactor.

According to a particular embodiment, said lamp-forming means of the first series form an angle ∂'1 with a plane P' perpendicular to the plane P, and said lamp-forming means of the second series form an angle ∂'2 with said plane P'.

Such a distribution further improves the distribution of radiation inside the chamber of the reactor.

According to a preferred embodiment, the reactor has two sets of UV lamp-forming means, namely:

a first set of UV lamp-forming means cooperating at one of their ends with access means provided on said inlet means and at the other of their ends with at least one first support element provided inside said housing; and, a second set of UV lamp-forming means cooperating at one of their ends with access means provided on said outlet means and at the other of their ends with at least one second support element provided inside said housing.

It is thus possible to obtain a reactor with a greater capacity while applying a homogeneous treatment, owing to the principle of the invention.

Moreover, as already indicated above, the bulk of the access means (their number being further increased by the use of a second set of lamps) for accessing the lamp-forming means is distributed among the inlet means and the outlet means. The access means are thus advantageously spaced apart from one another, thereby facilitating assembly and/or maintenance.

Said second set of lamp-forming means advantageously includes a first series of WV lamps forming at least one first zero or non-zero angle β1 with a longitudinal plane P of said cylinder and a second series of UV lamp-forming means forming at least one second non-zero angle β2 different from angle β1 with said plane P.

The advantageous arrangements for the first set of lamp-forming means are thus reproduced with the second set of lamp-forming means.

Preferably, said lamp-forming means of the first series form an angle β'1 with a plane P' perpendicular to the plane P, and said lamp-forming means of the second series form an angle β'2 with said plane P'.

According to a preferred solution, said first support and/or said second support essentially has (have) a star shape, of which the central portion receives the end of certain lamp-forming means and of which the points receive the ends of the other lamp-forming means.

A particularly simple design solution is thus obtained for the external housing of the reactor, which is therefore inexpensive to provide, for the assembly of lamps in the reactor.

In this case, said central portion of said supports is advantageously connected to said points by narrow branches.

Other features and advantages of the invention will become clearer upon reading the following description of two preferred embodiments of the invention, given by way of illustrative and non-limiting examples, and the appended drawings in which.

As already mentioned above, the principle of the invention is based on the arrangement, inside a cylindrical housing, of UV lamp-forming means tilted with respect to the longitudinal axis of the reactor (this tilt however does not make a right angle).

Figure 1:
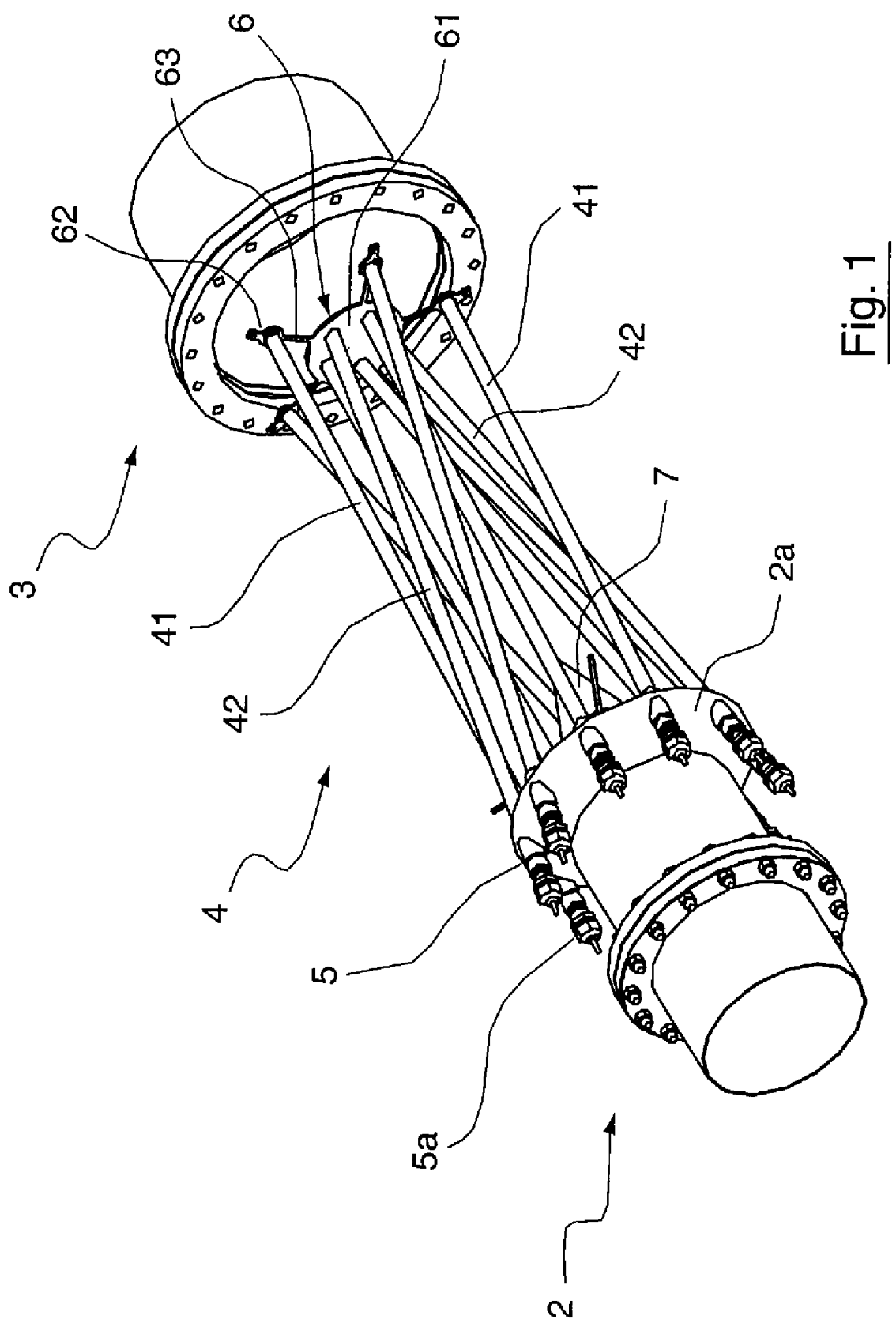
FIG. 1 is a perspective view of the internal structure of a reactor according to a first embodiment of the invention.

FIG. 1 shows a partial view of a first embodiment of a reactor according to the invention, in which the cylindrical housing is not shown so that the internal structure of the reactor can be revealed.

According to this embodiment, the reactor includes water inlet means 2 and water outlet means 3 between which a cylindrical housing extends (not shown). The inlet means 2 are designed so as to be integrated with a pipeline supplying water to be treated, while the outlet means 3 are designed to be integrated with a pipeline evacuating the treated water.

In this embodiment, ten UV lamp-forming means 4 are provided inside said housing. It is noted that in other embodiments, this number of lamp-forming means can of course be different. These lamp-forming means conventionally include a UV lamp itself and a quartz sheath protecting said lamp. In this embodiment, the lamps have a length of 1,500 mm and the quartz casings have a length of 1,700 mm. The cylindrical housing has a diameter of around 600 mm.

For indicative purposes, such a reactor has an installed power capacity of around 4 kW and therefore a UVC power of around 1.3 kW.

Each fo the lamp-forming means 4 is tilted with respect to the longitudinal axis of the reactor. It is noted, however, that in other embodiments, only some lamp-forming means can be tilted, while the other lamp-forming means can extend parallel to the longitudinal axis of the reactor.

All of the lamps 4 are connected at one of their ends to a support element 6 roughly having a star shape 6 provided in the reactor, toward the outlet thereof, and at the other of their ends to access means 5 provided on a substantially frusto-conical portion 2a of the water inlet means 2 allowing water into the reactor. These access means include orifices provided in this frusto-conical portion.

The support element 6 has a central portion 61 and points 62 connected to the central portion 61 by narrow branches 63. The narrowness of the branches 63 makes it possible to minimise the disturbance of the flow of water in the reactor.

The access means 5 receive the end of the quartz casings of the lamp-forming means and include protective means 5a (cap-type optionally capable of being screwed on) for protecting these ends.

Such a reactor has both the advantage of concentrating a large number of lamp-forming means in a cylindrical reactor space and of allowing easy access to the lamps for maintenance and replacement thereof.

To do this, it is simply necessary to remove the caps 5a and to remove the lamps by extracting them through the access means 5. During this operation, the quartz sheaths of the lamp-forming means remain in place. New lamps can then be inserted into the reactor. To do this, it is simply necessary to slide the lamps along the quartz sheaths, which operation is facilitated by Teflon rings arranged along the lamps.

In addition, a metal cone 7 is provided at the level of the lamp-forming means 42 so as to prevent a volume of water from being irradiated by the UV radiation distributed by the lamps, but directed to the lamps at the periphery.

According to this embodiment, the lamps 4 are distributed in two series, namely a first series of five lamp-forming means 41 of which one end is integrated with the points 62 of the element 6 and a second series of five lamp-forming means 42 of which one end is integrated with the central portion 61 of this element.

The lamp-forming means 41 of the first series are tilted at an angle different from the angle of tilt of the lamp-forming means 42 of the second series. It is noted, however, that, according to other embodiments, the number of lamp-forming means of the first series can be different from that of the second series.

The different angles of tilt of these lamp-forming means 41 and 42 will now be explained in greater detail in reference to FIGS. 2 and 3.

Figure 2:
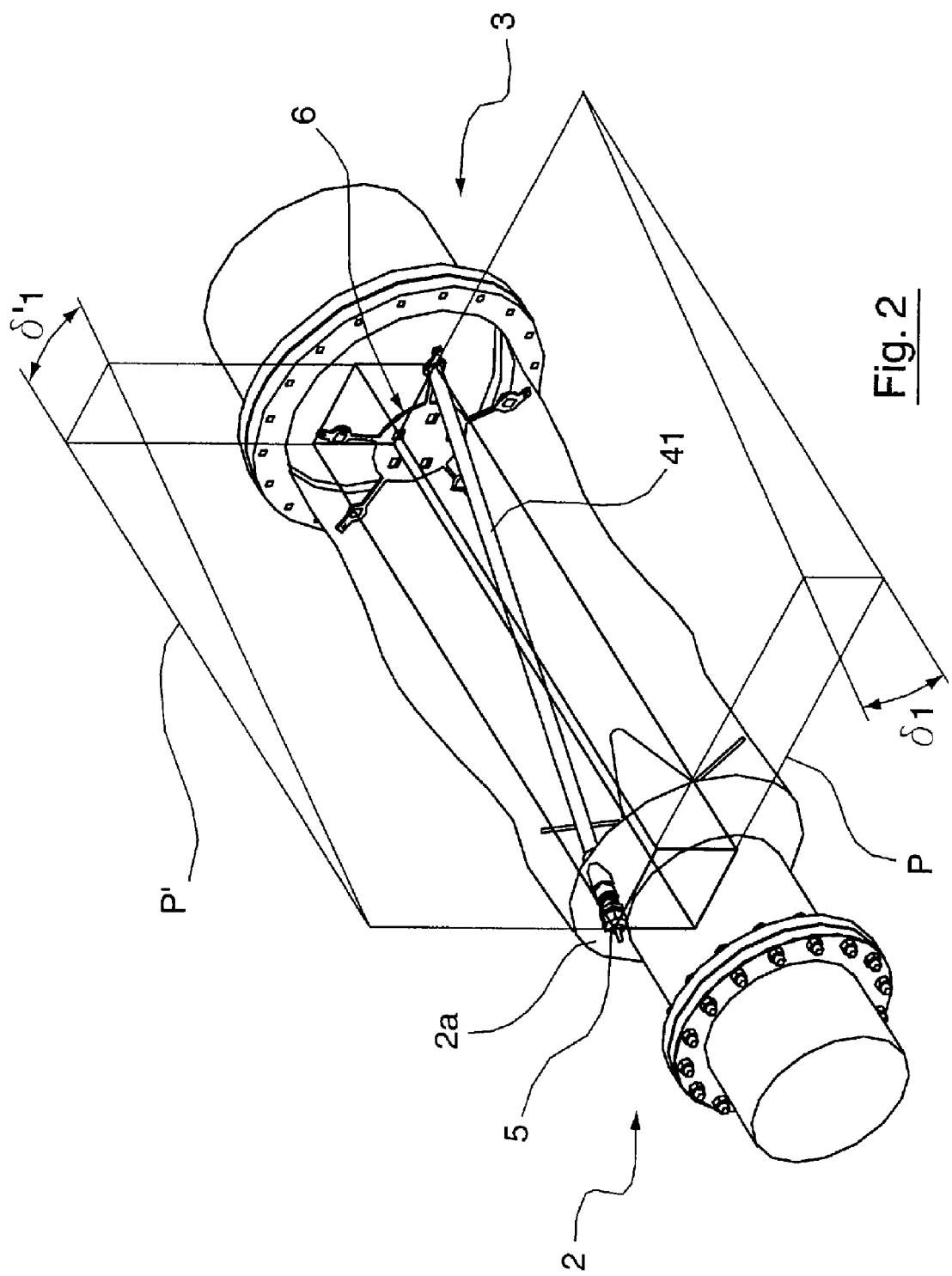
FIGS. 2 and 3 are partial views making it possible to show the angles characterising the tilt of the lamp-forming means in the reactor according to the first embodiment.

FIG. 2 shows the reactor shown in FIG. 1, but with only the lamp-forming means 41 of the first series. For the sake of clarity of the description, the longitudinal perpendicular planes P and P' of the reactor have been included in this figure.

As can be seen in this figure, these lamp-forming means 41 have:
- an angle of tilt $\partial 1$ with respect to a longitudinal plane P of the reactor equal to 7°, and
- an angle $\partial' 1$ with respect to a plane P' perpendicular to the plane P of the reactor equal to 8°.

It is noted that, in other embodiments, angle $\partial 1$ can more generally be between 5° and 50° and angle $\partial' 1$ can be between 0 and 30°, according to the embodiment.

Figure 3:
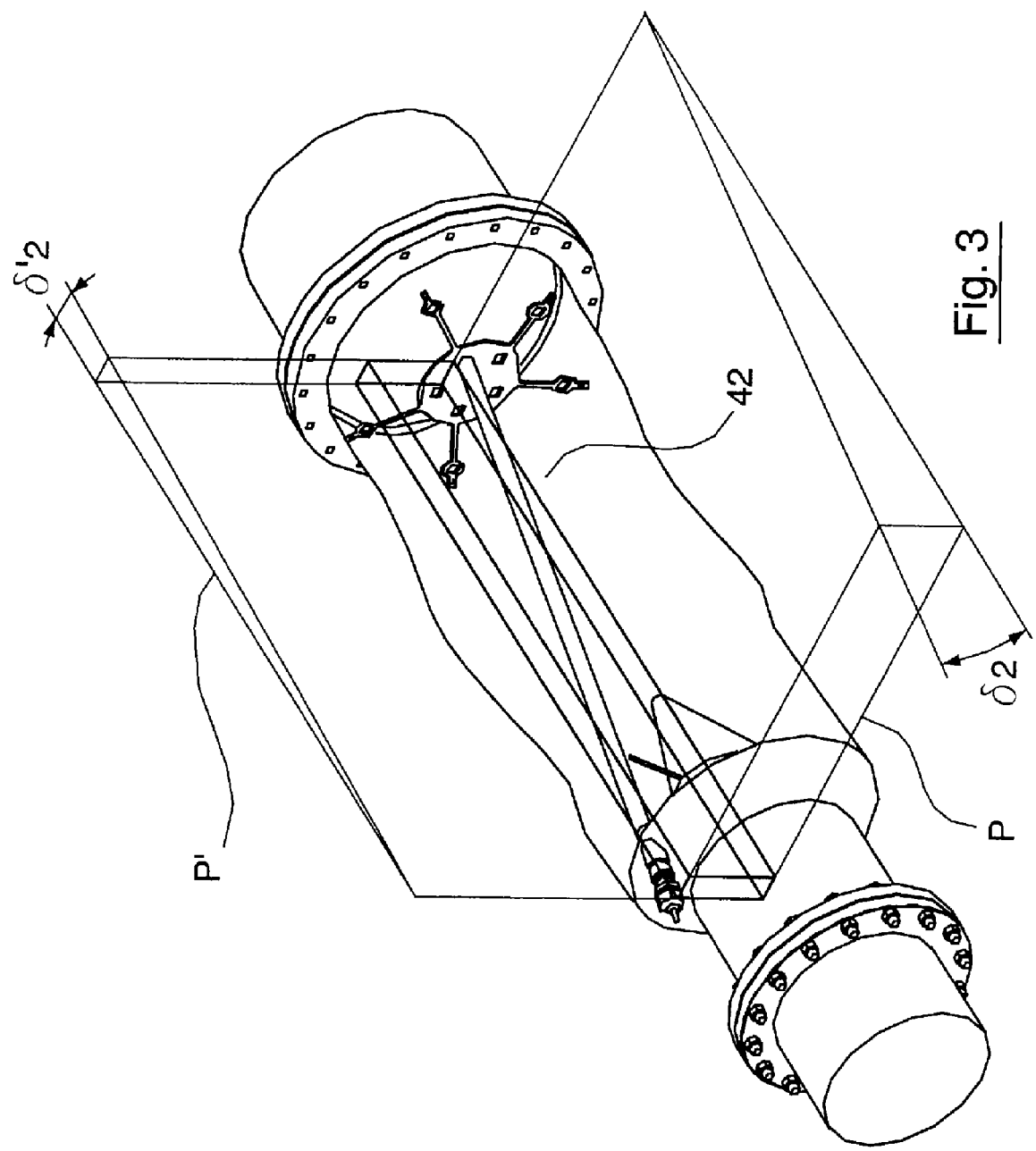

FIG. 3 shows the reactor shown in FIG. 1, but with only the lamp-forming means 42 of the second series. For the sake of clarity of the description, longitudinal perpendicular planes P and P' have been included in this figure.

As can be seen in this figure, these lamp-forming means 42 have:
- an angle of tilt $\partial 2$ with respect to a longitudinal plane P of the reactor equal to 8°, and
- an angle $\partial' 2$ with respect to a plane P' perpendicular to the plane P of the reactor equal to 2°.

It is noted that, in other embodiments, angles $\partial 1$ and $\partial 2$ can be between 5° and 50° and angles $\partial' 1$ and $\partial' 2$ can be between 0° and 30°.

Angles $\partial 1$ and $\partial 2$ represent the fact that the lamps come together toward the axis of rotation of the reactor. Angles $\partial' 1$ and $\partial' 2$, when they are not zero, represent the fact that these lamp-forming means, while coming together toward the axis of rotation of the reactor, do not converge there. We thus avoid problems in the assembly of the lamps, as well as a poor distribution of the power of said lamps resulting from excessive UV concentration at a given point.

Figure 4:
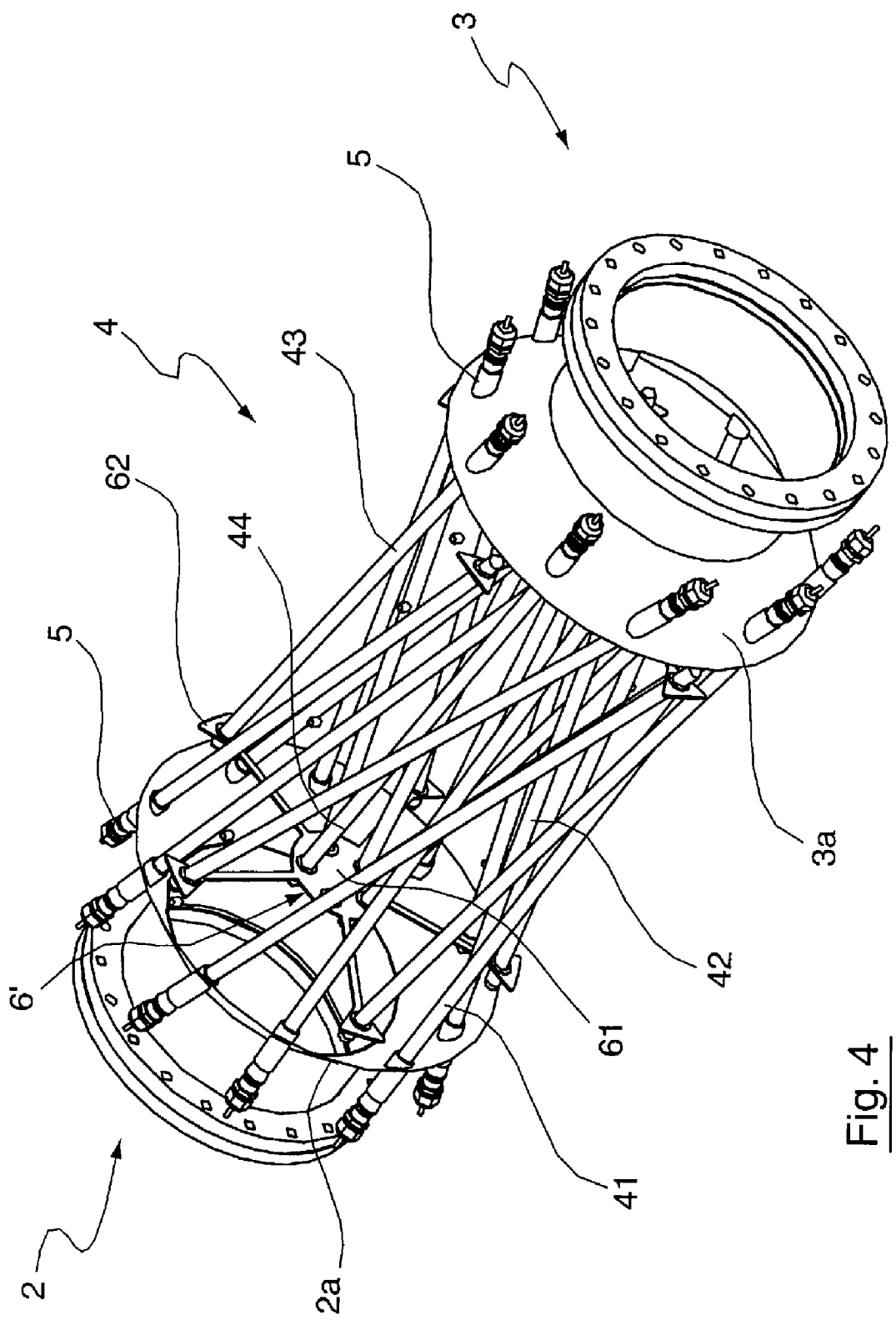
FIG. 4 is a perspective view of the internal structure of a reactor according to a second embodiment.

FIG. 4 shows a second embodiment of the invention in which, in addition to a first set of ten lamp-forming means 41, 42 arranged essentially as in the first embodiment described above, a second set of ten lamp-forming means 43, 44 is provided, of which one end is connected to access means provided on a frusto-conical portion 3a of the outlet means 3 and of which the other ends are connected to a support element 6' provided in the vicinity of the inlet means 2.

According to this embodiment, the two sets of lamp-forming means are in some way nested together in a head-to-tail arrangement.

In this second embodiment, the UV lamp-forming means have the same dimensions as those indicated above, but the cylindrical housing has a larger diameter, i.e. 955 mm. For indicative purposes, such a reactor has an installed power capacity of around 8 KW and therefore a UVC power of around 2.5 KW.

According to this second embodiment, the lamp-forming means 4 are therefore distributed into two sets of lamp-forming means, wherein each of these sets has two series of lamp-forming means.

The first and second sets of lamp-forming means 41, 42 are organised identically, but in opposite directions.

Thus, the second set of lamp-forming means includes two series of lamp-forming means, namely a first series of five lamp-forming means 43 of which one end is integrated with the points 62 of the element 6' and a second series of five lamp-forming means 43 of which one end is integrated with the central portion 61 of this element.

The lamp-forming means 41 of the first series are tilted at an angle different from the angle of tilt of the lamp-forming means 42 of the second series. It is noted, however, that, according to other embodiments the number of lamp-forming means of the first series can be different from that of the second series.

The different angles of tilt of these lamps 43 and 44 will now be explained in greater detail in reference to FIGS. 5 and 6.

Figure 5:
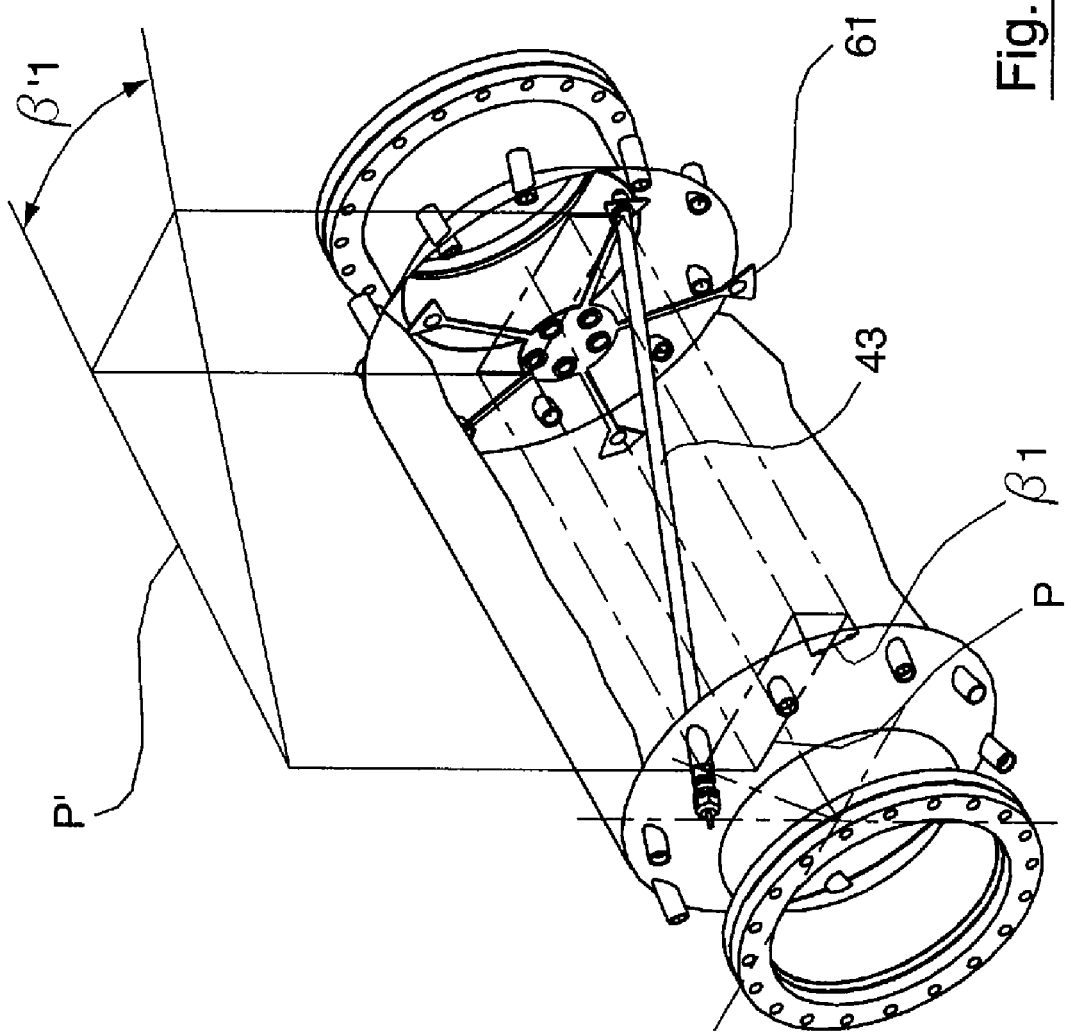
FIGS. 5 and 6 are partial views of a reactor making it possible to show the angles characterising the tilt of the lamp-forming means in the reactor according to the second embodiment.

FIG. 5 shows the reactor shown in FIG. 3, but with only the lamp-forming means 43 of the first series. For the sake of clarity of the description, the longitudinal perpendicular planes P and P' of the reactor have been included in this figure.

As can be seen in this figure, these lamp-forming means 43 have:
- an angle of tilt $\beta 1$ with respect to a longitudinal plane P of the reactor equal to 9°, and
- an angle $\beta' 1$ with respect to a plane P' perpendicular to the plane P of the reactor equal to 16°.

It is noted that, in other embodiments, angle $\beta' 1$ can more generally be between 5° and 50° and angle $\beta 1$ can be between 0° and 30°, according to the embodiment.

Figure 6:
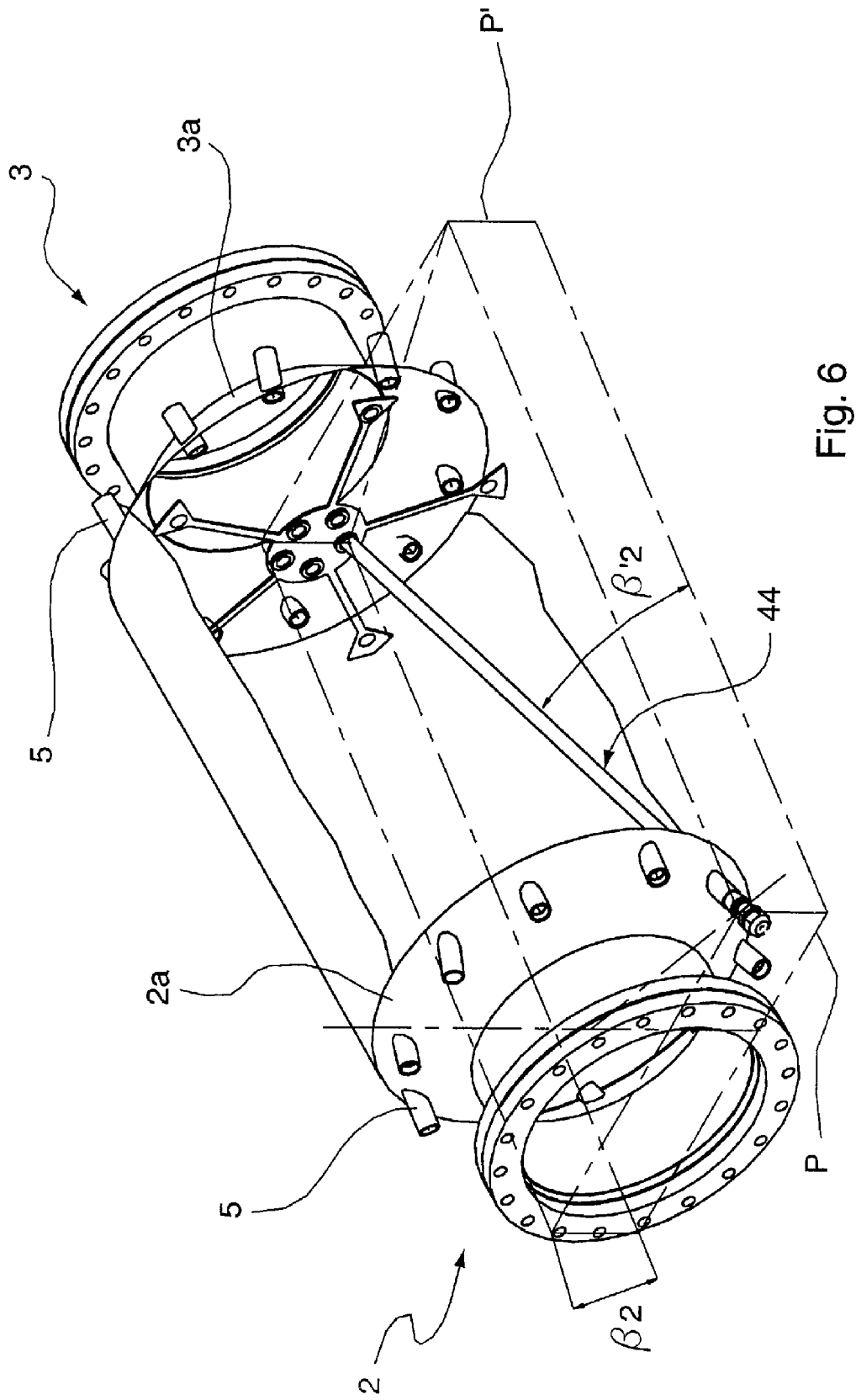

FIG. 6 shows the reactor shown in FIG. 1, but with only the lamp-forming means 42 of the second series. For the sake of clarity of the description, longitudinal perpendicular planes P and P' have been included in this figure.

As can be seen in this figure, these lamp-forming means 44 have:
- an angle of tilt $\beta 2$ with respect to a longitudinal plane P of the reactor equal to 6°, and
- an angle $\beta' 2$ with respect to a plane P' perpendicular to the plane P of the reactor equal to 29°.

It is noted that, in other embodiments, angles $\beta 1$ and $\beta 2$ can be between 10° and 50° and angles $\beta' 1$ and $\beta' 2$ can be between 0° and 30°.

It is noted that the angles indicated above can, according to the embodiment, vary in particular according to:
- the number of lamp-forming means provided in the reactor;
- the length of the lamp-forming means;
- the dimensions and the taper of the central cone;
- the dimensions and the taper of the frusto-conical portions 2a and/or 3a of the inlet means 2 or the outlet means 3 of the reactor;
- the diameter of the cylindrical housing of the reactor;
- the shape and dimensions of the inlet means 2 and/or the outlet means 3 of the reactor.

The invention claimed is:

1. A water treating device for treating drinking water, comprising;
a substantially cylindrical housing having a longitudinal axis, an inlet, and an outlet, and wherein water to be treated flows into the inlet, through a flowpath in the cylindrical housing and out the outlet;

a plurality of elongated UV lamps disposed in the cylindrical housing the UV lamps being arranged within the cylindrical housing such that the longitudinal axis of a series of the UV lamp forms a non-zero and non 90° angle with a longitudinal axis of the cylindrical housing; and wherein each of the UV lamps includes opposite ends, and wherein at least one end of each of the plurality of UV lamps are supported within the cylindrical housing and lie within the flowpath of the water flowing through the cylindrical housing.

2. The water treating device of claim 1, wherein said angle is less than 45°.

3. The water treating device of claim 1, wherein a plurality of the UV lamps are arranged inside the housing by forming a plurality of non-zero angles smaller than 90° with the longitudinal axis of the cylindrical housing.

4. The water treating device of claim 1, wherein said outlet or inlet supports one or more of the UV lamps.

5. The water treating device of claim 1, wherein the inlet or outlet includes a flange for receiving and supporting at least some of the UV lamps disposed within the cylindrical housing.

6. The water treating device of claim 5, wherein the flange that supports at least some of the UV lamps includes a circumferential flange spaced outwardly with respect to the longitudinal of the cylindrical housing.

7. The water treating device of claim 1, wherein the other end of each of the plurality of UV lamps lie outside of the cylindrical housing.

8. The water treating device of claim 1, including first and second sets of UV lamps, the first set of UV lamps forming at least one non-zero angle $\partial 1$ with the longitudinal axis of the cylindrical housing and the second series of UV lamps forming at least one non-zero angle $\partial 2$ different from angle $\partial 1$, with a longitudinal plane P of the cylindrical housing.

9. The water treating device of claim 8, wherein the first set of UV lamps form an acute angle $\partial' 1$ with a plane P' perpendicular to the plane P, and wherein the second set of UV lamps form an acute angle $\partial' 2$ with the plane P'.

10. The water treating device of claim 1, wherein the water treating device includes first and second sets of UV lamps;

the first set of UV lamps supported at one end by an access member disposed on one end portion of the cylindrical housing and supported at the other end in the cylindrical housing;

the second set of UV lamps supported at one end by a second access member disposed about an opposite end portion of the cylindrical housing and supported at the other end in the cylindrical housing.

11. The water treating device of claim 10 wherein said second set of UV lamps includes a first series of UV lamps forming at least one first zero or non-zero angle $\beta 1$ with a longitudinal plane P of the cylindrical housing and a second series of UV lamps forming at least one second non-zero angle $\beta 2$ different from angle $\beta 1$ with the plane P.

12. The water treating device of claim 11, wherein the first series of UV lamps form an acute angle $\beta' 1$ with a plane P' perpendicular to the plane P, and the UV lamps of the second series form an acute angle $\beta' 2$ with the plane P'.

13. The water treating device of claim 1, including a support disposed in the cylindrical housing for receiving and supporting the ends of a plurality of UV lamps; the support including a central portion for receiving and supporting the ends of a plurality of UV lamps and an outer portion, spaced outwardly from the central portion, for receiving and supporting the ends of a plurality of the UV lamps.

14. The water treating device of claim 13, wherein the support assumes a generally star shape.

15. The water treating device of claim 13, wherein the support includes a plurality of branches that extend radially from the central portion.

16. A water treating device for treating drinking water, comprising;

a cylindrical housing having a longitudinal axis;

an inlet for directing water to be treated into the cylindrical housing;

an outlet for directing treated water from the cylindrical housing;

a plurality of elongated UV lamps for treating the water passing through the cylindrical housing;

each UV lamp including a longitudinal axis and opposite ends, and wherein one end of each of the plurality of UV lamps lie outside of the cylindrical housing and the other end of each of the plurality of UV lamps are supported within the cylindrical housing;

the plurality of UV lamps being skewed with respect to the longitudinal axis of the cylindrical housing such that the longitudinal axis of each of the UV lamps extends generally longitudinally through the cylindrical housing and such that the UV lamps in the housing converge towards the longitudinal axis of the housing.

17. The water treating device of claim 16, wherein the plurality of UV lamps include a first series of UV lamps and a second series of UV lamps, and wherein the two series of UV lamps converge from opposite directions in the cylindrical housing.

18. The water treating device of claim 16, wherein the water treating device includes an inlet end portion, an outlet end portion and two sets of UV lamps, one set of UV lamps that converge from the inlet end portion of the cylindrical housing towards the outlet end portion and a second set of UV lamps that converge from the outlet end portion to the inlet end portion.

19. The water treating device of claim 16 including a UV lamp support structure disposed exteriorly of the cylindrical housing; and wherein the UV lamps project through the cylindrical housing and the ends of the UV lamps that lie outside of the cylindrical housing are held and supported by the UV lamp support structure disposed exteriorly of the cylindrical housing.

20. The water treating device of claim 19 wherein the UV lamp support structure includes a collar that projects outwardly from the cylindrical housing and extends around the cylindrical housing; a series of circumferentially spaced openings formed in the collar for receiving and holding the ends of the UV lamps that lie outside of the cylindrical housing.

21. The water treating device of claim 19 wherein the ends of the UV lamps that are supported within the cylindrical housing are supported at points around the longitudinal axis of the cylindrical housing, and wherein the ends of the UV lamps that are supported within the cylindrical housing are supported at points that are generally equal distances from the longitudinal axis of the cylindrical housing.

22. A water treating device for treating drinking water, comprising:

a housing having a longitudinal axis;

an inlet for directing water to be treated into the housing;

an outlet for directing treated water from the housing;

the housing including an internal chamber for containing water flowing through the chamber;

a plurality of UV lamps for treating water flowing through the internal chamber of the housing;

each UV lamp projecting through the housing and having an internal end portion disposed in the internal chamber and an external end portion that projects outwardly from the internal chamber and is disposed exteriorly of the housing;

wherein the internal end portion of each UV lamp is skewed with respect to the longitudinal axis of the housing;

an internal support disposed within the internal chamber for receiving and supporting the internal end portions of the UV lamps;

an external UV lamp support structure disposed exteriorly of the internal chamber and disposed outwardly of the housing;

the external end portions of the UV lamps projecting outwardly from the housing and being received and held by the external UV lamp support structure such that the external end portions of the UV lamps are accessible externally of the housing so as to permit their respective UV lamps to be easily replaced without requiring direct access to the internal chamber.

23. The water treating device of claim 22 wherein the housing and internal chamber are generally elongated and wherein the internal portions of the UV lamps extend generally longitudinally through the internal chamber and wherein the internal portions of the UV lamps generally converge towards the longitudinal axis of the housing.

24. The water treating device of claim 23 wherein the UV lamps include first and second sets of UV lamps with the first set of UV lamps projecting in one direction through the internal chamber, and the second set of UV lamps protecting in a second direction through the internal chamber, and wherein the UV lamps of the first and second sets crisscross in the internal chamber.

25. A water treating device for treating drinking water, comprising;

a cylindrical housing having a longitudinal axis;

an inlet for directing water to be treated into the cylindrical housing;

an outlet for directing treated water from the cylindrical housing;

a plurality of elongated UV lamps for treating the water passing through the cylindrical housing, each UV lamp including a longitudinal axis and opposite ends, and wherein one end of each of the plurality of UV lamps lie outside of the cylindrical housing and the other end of each of the plurality of UV lamps are supported within the cylindrical housing;

a support structure, for receiving and supporting the plurality of UV lamps, disposed within the cylindrical housing;

a first set of the plurality of UV lamps having ends circumferentially spaced and supported by the support structure at a first radius relative to the longitudinal axis; and a second set of the plurality of UV lamps having ends circumferentially spaced and supported by the support structure at a second radius relative to the longitudinal axis;

wherein the plurality of UV lamps extending generally longitudinally through the cylindrical housing such the plurality of UV lamps converge towards longitudinal axis.

* * * * *